United States Patent [19]

Schuchard

[11] 4,164,016
[45] Aug. 7, 1979

[54] CURRENT SENSING SYSTEM

[75] Inventor: Walter F. Schuchard, Hingham, Mass.

[73] Assignee: ESB Incorporated, Philadelphia, Pa.

[21] Appl. No.: 960,075

[22] Filed: Nov. 13, 1978

[51] Int. Cl.² .................................... H02M 7/155
[52] U.S. Cl. .................................. 363/88; 363/85; 363/128
[58] Field of Search ............... 307/252 N; 323/22 SC, 323/39, 105, 121, 125; 363/37, 81, 84, 85, 86, 88, 94, 114, 116, 117, 118, 125, 128

[56] References Cited

U.S. PATENT DOCUMENTS

| | | | |
|---|---|---|---|
| 1,857,174 | 5/1932 | Zucker | 363/118 X |
| 1,873,652 | 8/1932 | Lord | 363/116 |
| 1,968,632 | 7/1934 | Bobertz | 363/118 |
| 2,292,397 | 8/1942 | Overbeck | 363/118 X |
| 2,569,698 | 10/1951 | Shepard, Jr. | 323/122 X |
| 3,362,900 | 1/1968 | Sabins | 363/88 X |

Primary Examiner—William M. Shoop
Attorney, Agent, or Firm—E. C. MacQueen

[57] ABSTRACT

A circuit for sensing the current applied to a load in power supplies, inverters, and other power conversion equipment and similar systems wherein the voltage between the center tap of the transformer secondary winding and the junction of two resistors connected across the secondary winding in series is sensed. The control circuit for the electronic system adjusts the overall system operation to obtain the desired volt-ampere output in response to this voltage level.

4 Claims, 2 Drawing Figures

CURRENT SENSING SYSTEM

BACKGROUND OF THE INVENTION

This invention relates to power conversion systems and more specifically to a current sensing system for use in D.C. power supplies having a predetermined volt-ampere output characteristic.

"Power Conversion Systems" is used in this specification to denote various types of power supplies and other types of systems wherein the principle of this invention would apply, and is not used to limit the application of the subject invention.

Conventional power conversion systems are frequently designed to provide a predetermined volt-ampere output characteristic, despite changes in the load resistance. These types of systems therefore require sensing of the system output voltage and current so that the system operation can be appropriately adjusted to maintain the desired output characteristic. Some systems also require sensing of the output current for safety reasons so that in the event output current rises above a predetermined safe level, the system is turned off.

This current sensing function is usually accomplished by providing a shunt resistor in an appropriate part of the circuit, usually near the output. However, this alternative has several drawbacks. One problem is that the shunt is usually subjected to high current levels because of its location in the circuit. As a result, the shunt resistor and the associated electronic elements for determining the current through the resistor must be designed so that they can withstand the high current and voltage levels at that point in the circuit. These components will also often use a fair amount of the system's power output available. Using high power elements also necessarily increases the production cost of such a system.

Ideally, a current sensing system should be designed so that the more economical low power and low tolerance components can be used, without unduly complicating the circuit and without reducing its reliability and accuracy.

SUMMARY OF THE INVENTION

In accordance with the preferred embodiment, a current sensing system is provided which accomplishes these objectives. The current sensing system is interconnected in the low current portion of a power conversion system at the transformer secondary. It's design permits the use of low cost circuit elements having a low power and low tolerance components. The current system tolerance components. The current sensing system is specifically applicable for a power conversion system, or any system wherein a center tapped transformer is used so that each half of its winding conducts alternately.

The preferred embodiment comprises two resistors having approximately equal values which are connected in series across the full transformer secondary winding. The voltage between the junction of the two resistors and the center tap of the secondary winding is integrated and used by the power conversion control system to control the power system output, since the integrated voltage is linearly proportional to the average current in the transformer windings, which is the average output current for the conversion system.

The current sensing system disclosed herein provides the advantage that it is not located in the high current portion of the power conversion circuitry and can be constructed from the less expensive low power components. The circuit design also permits the use of lower tolerance components without sacrificing circuit accuracy and reliability.

A better understanding of the invention and its advantages can be seen in the following description of the figures and the preferred embodiments.

DESCRIPTION OF THE DRAWING AND PREFERRED EMBODIMENT

Figure 1:
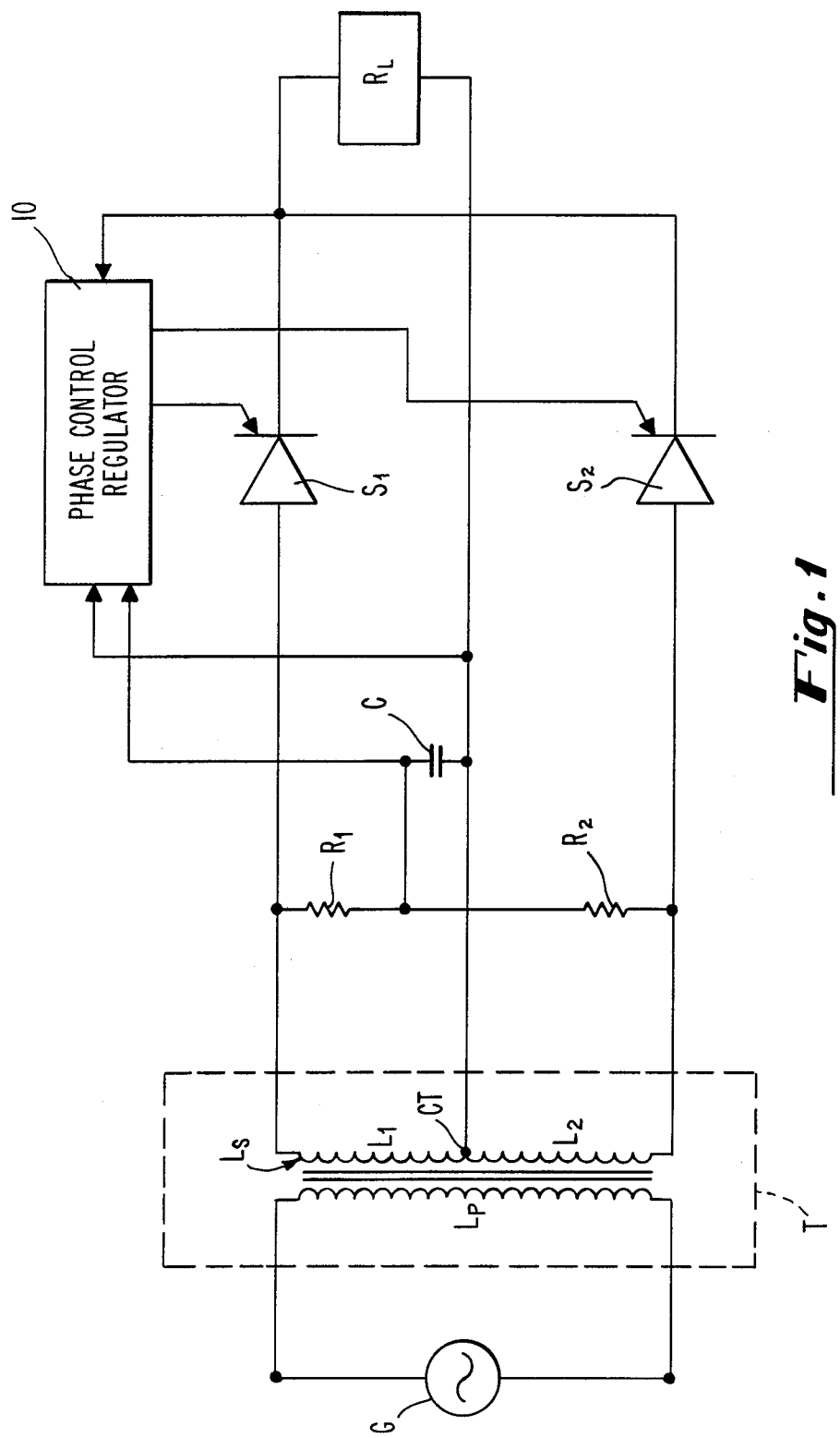
FIG. 1 is a circuit diagram of a D.C. power supply using a center tapped isolation transformer and having the current sensing system of the subject invention.

The D.C. power supply shown in FIG. 1 is used by way of example as the preferred embodiment of the subject invention, and is not used to limit the application and scope of the invention.

The power supply shown in FIG. 1 is designed as a foldback current limiting circuit for a full wave center tapped transformer which is phase controlled by silicon controlled rectifiers (SCR's). The power supply circuit has an isolation transformer T with its primary winding $L_p$ connected to a commercial source of power, such as public utility, designated by generator G. Secondary winding $L_s$ of transformer T is center tapped to form two inductive coils $L_1$ and $L_2$. Secondary winding $L_s$ is connected to load resistance $R_L$ through SCR's $S_1$ and $S_2$. Phase control regulator 10 operates in a conventional fashion to fire SCR's $S_1$ and $S_2$ in an alternate fashion so that a DC input into load resistance $R_L$ is obtained. (Systems which control SCR firing to obtain a DC output from an AC input are well known in the art and need not be discussed.)

As stated above, it has been conventional in the prior art to connect a shunt resistor in series with the load resistance $R_L$ to determine the output current produced and to control the firing of switching devices in response thereto. As an alternative to this shunt resistor system, a preferred embodiment is provided which utilizes $R_1$ and $R_2$ connected in series across secondary coil $L_s$. Capacitor C is connected between the junction of $R_1$ and $R_2$, noted as terminal "A," and the center tap of secondary winding $L_s$, noted as CT. Capacitor C acts as an integrater to integrate the voltage between terminals CT and A, as well as to smooth any irregularities which may occur.

The current sensing system is based on the theory that the average current in secondary winding $L_s$ is essentially equal to the average output current applied to load resistance $R_L$, and that the integrated voltage between junction A and the center tap is linearly proportional to the average current in secondary winding $L_s$. Therefore, low power components can be used to determine the output current indirectly.

The specific circuit configuration for the current sensing system is designed so that precision components are not necessary. The reason for this can be seen by some basic mathematical calculations. Assuming that the instantaneous voltage between junctions A and CT are proportional to the instantaneous current, the voltage differential between junctions A and CT would be approximately equal to one half of the internal resistance voltage drop in the conducting half winding, $L_1$ or $L_2$. When this voltage differential is integrated, any differences in the values of inductions between windings $L_1$ and $L_2$ or resistive differences between $R_1$ and $R_2$ cancel, thereby eliminating the need for any precision components for the current sensing system.

Figure 2:
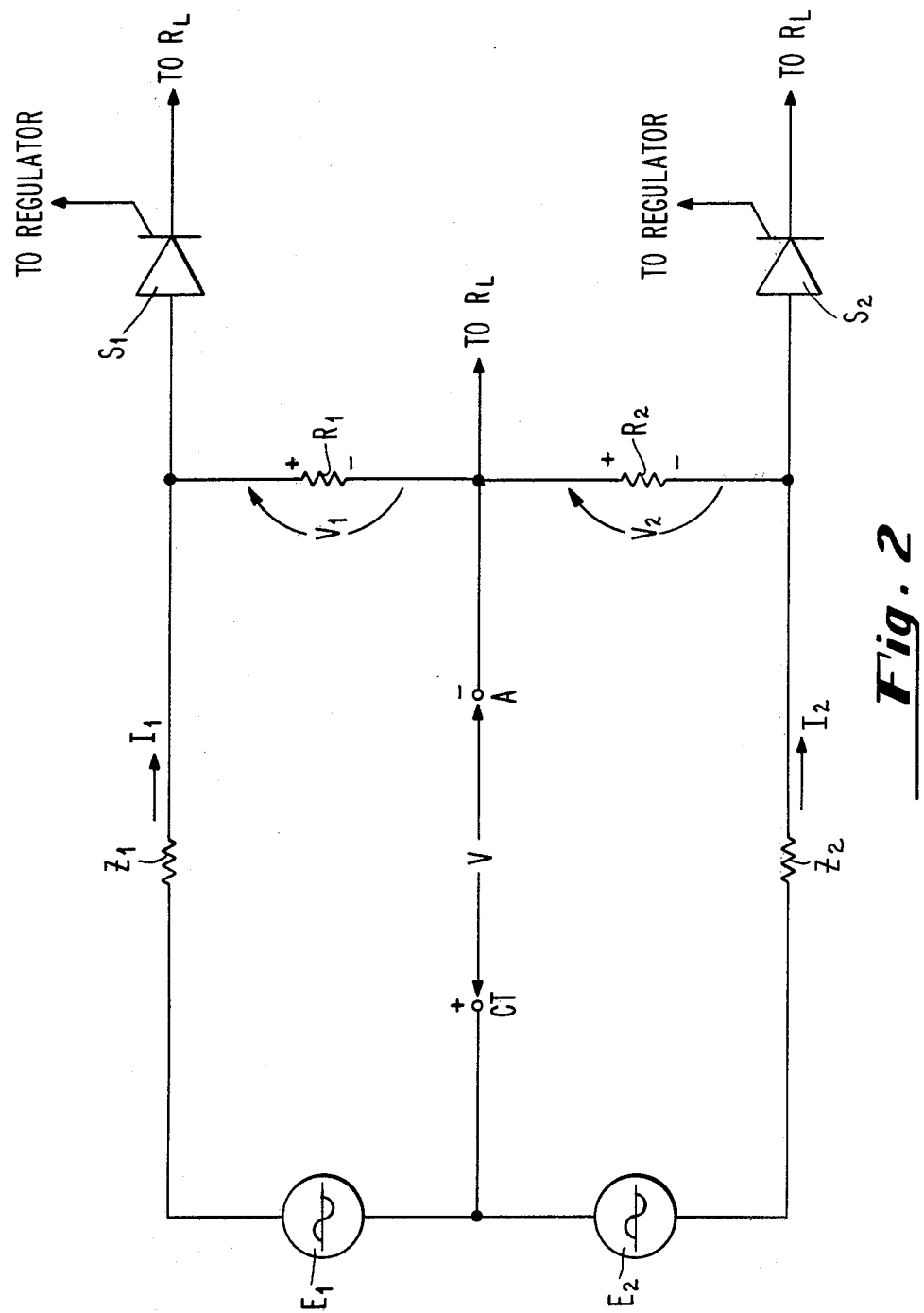
FIG. 2 is an equivalent circuit of a portion of that in FIG. 1.

A better understanding of the theory behind this invention can be seen by reference to FIG. 2, wherein an equivalent circuit of the current sensing portion of the circuit of FIG. 1 is shown. Two generators are used to indicate the alternate conduction through each half of secondary winding $L_s$. $Z_1$ and $Z_2$ indicate the impedance except $R_1$ and $R_2$, in their respective loops. The balance of the circuit is similar to that in FIG. 1.

During the first half cycle of the power signal received, the value of the voltage between CT and A can be expressed as:

$$V' = -E_1 + I_1 + V_1$$

or $$V' = E_2 - V_2$$

During the second half cycle, the voltage between CT and A can be expressed as:

$$V'' = -E_2 + I_2 + V_2$$

or $$V'' = E_1 - V_1$$

Since the average output current value is desired, the average voltage between CT and A must be determined. This could be obtained by adding V' and V'' and dividing by "2" to obtain the average voltage during one cycle. However, the calculations are easier if the average is obtained by first multiplying both the numerator and denominator by "2", giving:

$$V \text{ average } (2V' + 2V'')/4$$

Using both equations for each V' and V''', the resulting equation becomes:

$$V \text{ average } I_1 + I_2/4$$

From this exercise, it can be seen that the impedance values of $R_1$, $R_2$, L and $L_2$ do not affect the relationship of the voltage between CT and A, and that this voltage is related to the current provided to $R_L$.

In operation, referring back to FIG. 1, an AC input signal from generator G is received by isolation transformer T on its primary winding $L_p$, which is applied to secondary winding $L_s$. Phase control regulator 10 alternates the firing of SCR's $S_1$ and $S_2$ to provide DC power to load resistance $R_L$. The DC power supply can be preset so as to provide a current of a predetermined value to load resistance $R_L$. Phase control regulator 10 adjusts the firing of SCR's $S_1$ and $S_2$ until the integrated voltage across capacitor C reaches the appropriate value, indicating that the desired output current has been obtained. As the power supply continues to operate, in the event that load resistance should change, the current being provided to the load will accordingly change and cause the voltage on capacitor C to change in proportion thereto, which thereby causes phase control regulator 10 to readjust its firing of SCR's $S_1$ and $S_2$ until the current output reaches the desired level, as indicated by the voltage level on capacitor C.

As can be seen, the current sensing system disclosed herein provides a simple and inexpensive way for sensing current which does not require components in the high current portion of power conversion circuits, but in turn permits the use of circuitry using low power components.

While a particular embodiment of this invention has been shown and described, it is obvious that changes and modifications can be made without departing from the true spirit and scope of the invention. It is the intention in the appended claims to cover all such changes and modifications.

The invention claimed is:

1. In a system receiving a power signal through a transformer having a center tapped secondary winding and having control means for adjusting the power signal to produce an output having a predetermined output current characteristic, a current sensing system comprising:
   (a) two resistors connected in series across the secondary winding;
   (b) a capacitor connected between the common junction of the resistors and the center tapped terminal; and
   (c) means for detecting the voltage between the common junction of the impedances and the center tap, said voltage being provided to said control means so that the system output current is varied until it reaches a predetermined level.

2. In a system having means for changing a power signal received from a full wave center tapped inductor to provide an output across a load having a predetermined output current characteristic, a current sensing system comprising:
   (a) two resistors connected in series across the full wave center tapped inductor;
   (b) capacitance means are connected between the common junction of the resistors and the center tapped terminal;
   (c) means for detecting the voltage between the common junction of the two resistors and the center tapped terminal; and
   (d) means for adjusting the output current in response to the detected voltage so that said output current is maintained at a predetermined level.

3. In a system for converting AC power received through a transformer having a center tapped secondary winding, a plurality of switching means connected between the secondary winding and the load, and means for actuating the switch means in relation to the other so that a DC signal is provided to the load; a current sensing system comprising:
   (a) two resistors connected in series across the full wave center tapped winding;
   (b) capacitance means connected between the common junction of the resistors and the center tapped terminal;
   (c) means for detecting the voltage between the common junction of the two resistors and the center tap terminal; and (d) means for adjusting the output current in response to the detected voltage so that said output current is maintained at a predetermined level.

4. A method of providing DC power to a load resistance using a system having an isolation transformer having a center tapped secondary winding connected to the load resistance through a plurality of SCR's, with the other load resistance terminal connected to the transformer center tap; two resistors connected in series across the center tapped secondary winding; and capacitor means connected between the common junction of the resistors and the center tapped terminal; said method comprising:

(a) monitoring the voltage between the center tap and the common junction between said two resistors; and (b) controlling the firing of the SCR's in response to said voltage to produce an input signal to the load resistance having a predetermined current characteristic.

* * * * *